UNITED STATES PATENT OFFICE.

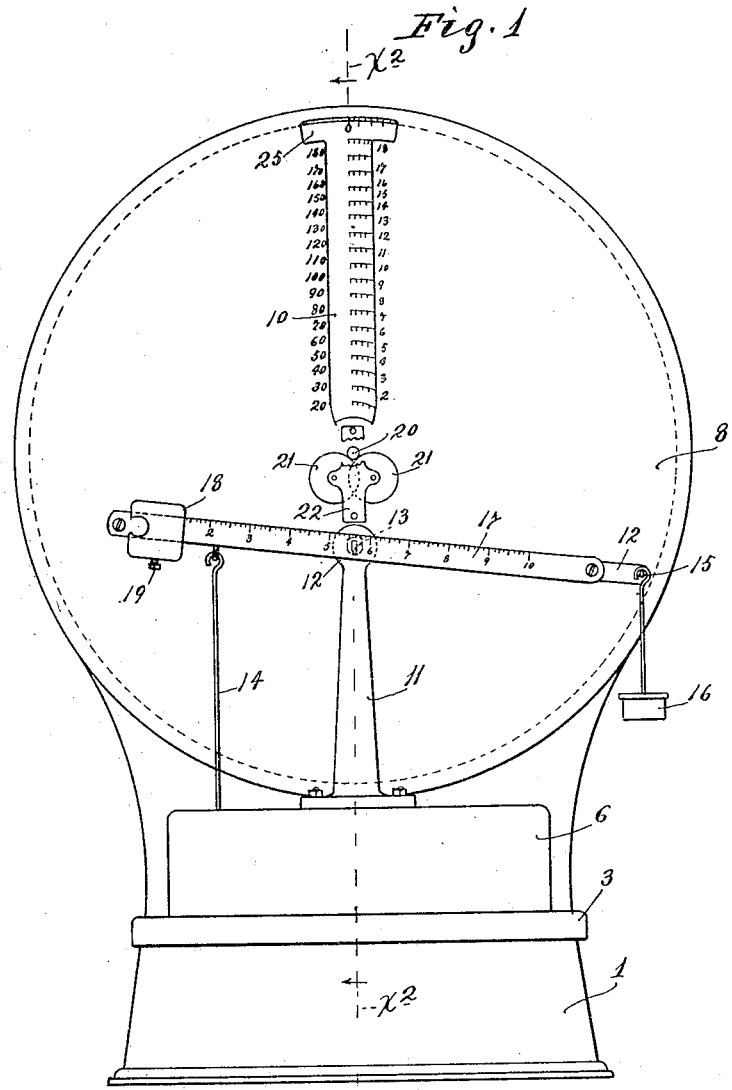

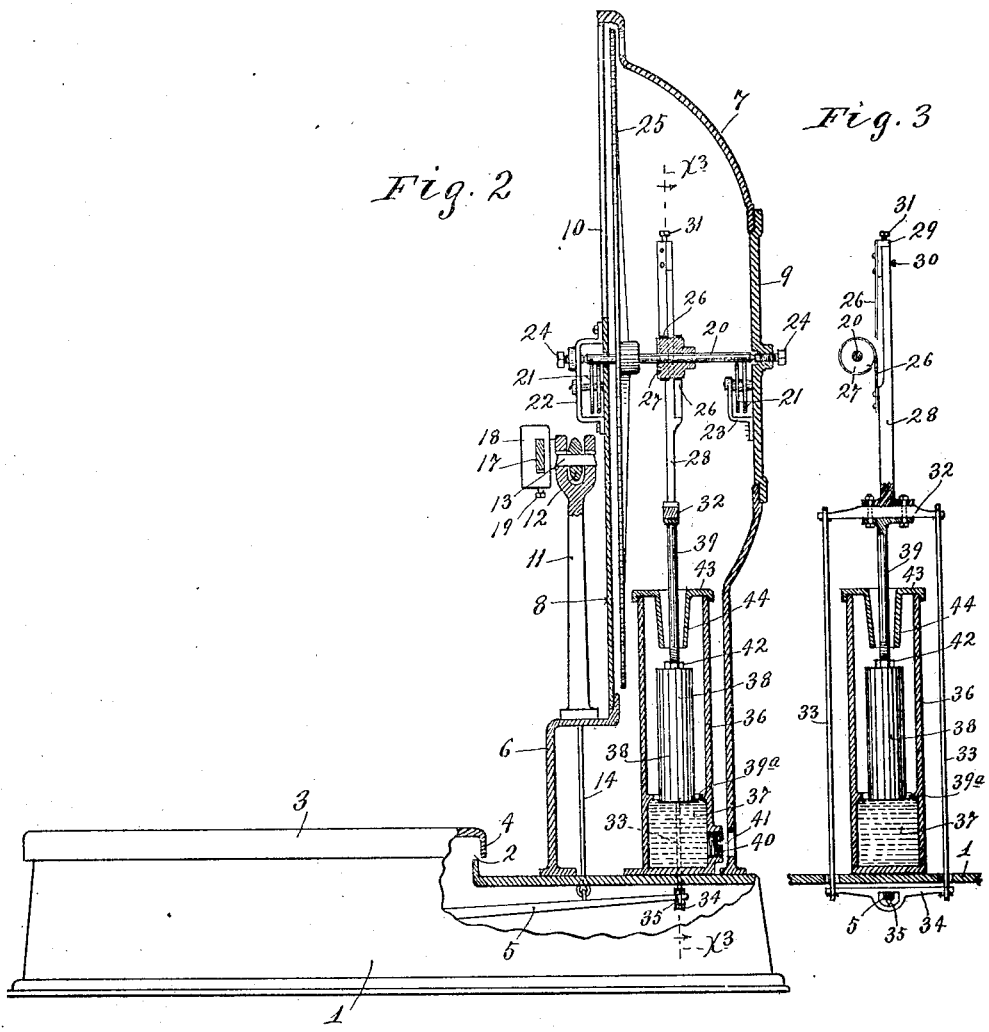

OTIS M. KIRLIN, OF WATERTOWN, SOUTH DAKOTA.

SCALE.

1,282,859.   Specification of Letters Patent.   Patented Oct. 29, 1918.

Application filed February 3, 1916. Serial No. 75,956.

*To all whom it may concern:*

Be it known that I, OTIS M. KIRLIN, a citizen of the United States, residing at Watertown, in the county of Codington and State of South Dakota, have invented certain new and useful Improvements in Scales; and I do hereby declare the following to be a full, clear, and exact description of the invention, such as will enable others skilled in the art to which it appertains to make and use the same.

My invention relates to improvements in scales, and particularly to scales of the type disclosed and claimed in my co-pending application, filed March 11, 1915, S. N. 13,695, and allowed October 28, 1915.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a front elevation of the improved scale, some parts being broken away;

Fig. 2 is a view, partly in side elevation and partly in vertical section taken on the line $x^2 \, x^2$ of Fig. 1; and Fig. 3 is a view, principally in section taken on the line $x^3 \, x^3$ of Fig. 2.

The numeral 1 indicates a hollow base with a flanged opening 2 in its top over which is located a scale platform 3, having a depending marginal flange 4, which embraces a flange of the said opening. Fulcrumed within the base 1, is a scale beam 5 on which the scale platform 3 is supported in the customary manner. Supported on the base 1, at one side of the scale platform 3, is a scale body 6 which, in turn, supports a vertically extended annular casing 7 having a face plate 8 and back plate 9, both of which are detachably secured in position by screws or other suitable means, not shown.

Formed in the face plate 8, is a perpendicular slot which affords a sight opening 10 into the interior of the casing 7. This sight opening 10, at its upper extremity, is widened to increase the field of said opening.

Supported on the scale body 6, in front of the face plate 8, is a standard 11 located directly under the projected axis of the casing 7. The upper end of this standard 11 is bifurcated to receive a beam 12, intermediately fulcrumed on a knife bearing 13 in the prongs of the bifurcated end of said standard. The left hand end portion of the beam 12 is connected to the scale beam 5 by a long link 14, which works through the top of the base 1 and the top of the scale body 6. Suspended from a knife bearing 15, on the right hand end of the beam 12, is the customary stem-equipped weight 16 adapted to receive and hold one or more notched weights, not shown. Secured to the outer side of the beam 12 and spaced apart therefrom, is a bar 17, graduated into pounds and fractions thereof. Slidably mounted on this bar 17, is a poise 18 for coöperation with the graduations thereon. A set screw 19 is provided for securing the poise 18 to the bar 17, in different set positions.

Extended axially through the face plate 8 into the casing 7, is a horizontal dial shaft 20 loosely journaled on the peripheries of pairs of overlapped bearing wheels 21. One set of these bearing wheels 21 is journaled in the face plate 8 and a bracket 22 secured to the outer surface thereof and the other set is journaled in the back plate 9 and a bracket 23 secured to the inner surface thereof. The ends of the dial shaft 20 are conical in form and journaled in the ends of set screws 24, one of which has screw-threaded engagement with a back plate 9 and the other of which has screw-threaded engagement with the bracket 22.

An indicator dial 25 is mounted on the dial shaft 20, for rotation therewith, within the casing 7, close to the face plate 8. This indicator dial 25 is graduated to indicate pounds and fractions thereof and value amounts, the same as in my above identified co-pending application. The weight graduations are visible through the expanded portion of the sight opening 10. The sight opening 10 is covered by a transparent panel, not shown, and a hair line, preferably colored, is drawn through the vertical center of the panel and with which the zero point of the dial 25 registers when in normal position. On the vertical edge portions of the face plate 8, at the sight opening 10, is indicated prices in cents per pound. The weight graduations and computed amounts upon the rotating dial 25 are visible through the sight opening 10 and are to be read on the hair line, and said computed amounts coincide with the stationary price amounts marked on the face plate 8, on either side of said sight opening.

The shaft 20 and hence the dial 25 is oscillated from the scale beam 5 by a pair of flexible connections, as shown, in the form of steel tapes 26, the inner ends of which are reversely wound upon a drum 27 and secured thereto. This drum 27 is mounted on the shaft 20 and keyed for rotation therewith. The outer ends of the tapes 26 are extended vertically in opposite directions and secured to a vertically extended bar 28, located at one side of the drum 27. The lower tape 26 is rigidly secured by screws to the bar 28, while the upper tape 26 is adjustably secured thereto by a block 29. This block 29 is slidably secured to the bar 28 by a set screw 30, which works through a slot in said bar and has screw-threaded engagement with the block 29. A slow motion screw 31 is provided for adjusting the block 29 longitudinally on the bar 28. Obviously, by adjusting the screw 31, the tension of the tapes 26 may be varied, at will.

Bolted to the lower end of the bar 28, is a horizontal cross head 32, from the ends of which is supported a pair of depending links 33, which work through apertures in the top of the base 1. The lower ends of the links 33 support, within the base 1, a horizontal cross head 34 having, at its intermediate portion, a pivot 35 for the free end of the scale beam 5.

To give a steady action to the movable parts of the scale and to eliminate vibration of the dial 25, I provide a retarding device comprising a cylindrical receptacle 36, partly filled with liquid 37, which normally bears upon its surface a float 38 having a stem 39 bolted to the underside of the cross head 32. The receptacle 36 is supported upon the hollow base 1 between the links 33. Under the weighing movement of the scale beam 5, the float 38 is variably forced into the liquid 37 and to restrict the rate of movement of the liquid 37 displaced by the float 38, I form, on the inner wall of the receptacle 36, an annular flange 39ª located substantially at the liquid level. This flange 39ª forms a restricted passage through which the float 38 moves vertically and the displaced liquid 37 is forced upward through this restricted passage.

To slightly vary the altitude of the liquid 37, in the receptacle, I mount in the rear wall of said receptacle, below the flange 39ª, a relatively heavy screw plug 40 adapted to be projected into or withdrawn from the liquid 37 and thereby raise or lower the level of the liquid, as the case may be. This screw plug 40 may be turned by a screw driver inserted through an aperture 41 in the rear wall of the casing 7.

The stem 39 is screwed into the float 38 and held against rotation with respect thereto by a lock nut 42, thus making it possible to vertically adjust the float with respect to the liquid level. To prevent the liquid 37 from spilling, in case the scale is turned onto its side, I provide a cover 43 for the receptacle 36 with a depending contracted sleeve 44, through which the stem 39 of the float works.

The liquid 37 is preferably mercury and the receptacle 36 and float 38 of vulcanite or other material that has substantially the same ratio of temperature expansion and contraction as mercury, although other liquids and materials may be used. The purpose of using such materials is, of course, to prevent uneven expansion and contraction of the elements, which would change the level of the liquid, with respect to the float. By adjusting the screw plug 40, or vertically adjusting the float 38 on its stem 39, or by adjusting both thereof, said float may be normally supported in its correct position, with respect to the liquid.

The beam 12 operates as an ordinary beam and the weight or weights, on its outer end, being heavy enough, at all times, to hold down the beam. This beam 12 is for tare weight and weights above the capacity of the indicator dial 25, and also used for balancing the weight of the scale platform, levers, etc.

The term "float" is herein used in a broad sense to cover a plunger or the like.

What I claim is:

1. In a scale, the combination with a scale beam, and an indicator actuated thereby, of a retarding device comprising a liquid containing receptacle, a float, and a connection for forcing the float variably into the liquid under the weighing movement of the scale beam, said receptacle, liquid and float being materials having substantially the same ratio of temperature expansion and contraction.

2. In a scale, the combination with a scale beam, and an indicator actuated thereby, of a retarding device comprising a liquid containing receptacle, a float, and a connection for forcing the float variably into the liquid under the weighing movement of the scale beam, said receptacle having a restricted intermediate passage within which the float loosely works.

3. In a scale, the combination with a scale beam, of a shaft, an indicator carried by said shaft, a bar for oscillating said shaft, upper and lower cross heads, said upper cross head being carried by said bar, a pair of links suspending the lower cross head from the upper cross head, said scale beam having a bearing on the lower cross head, a liquid containing receptacle located between said links, and a float carried by said bar and arranged to be forced variably into the liquid under the weighing movement of the scale beam.

4. In a scale, the combination with a scale beam, of a shaft, an indicator carried by said shaft, a bar for oscillating said shaft, upper and lower cross heads, said upper cross head being carried by said bar, a pair of links suspending the lower cross head from the upper cross head, said scale beam having a bearing on the lower cross head, and a retarding device located between said links and acting upon said bar.

In testimony whereof I affix my signature in presence of two witnesses.

OTIS M. KIRLIN.

Witnesses:
PERCY F. LOUCKS,
ARTHUR H. HASEHE.

Copies of this patent may be obtained for five cents each, by addressing the "Commissioner of Patents, Washington, D. C."